United States Patent
Kang et al.

(10) Patent No.: US 10,370,248 B2
(45) Date of Patent: Aug. 6, 2019

(54) MAXIMIZING STEAM METHANE REFORMER COMBUSTION EFFICIENCY BY PRE-HEATING PRE-REFORMED FUEL GAS

(71) Applicant: L'Air Liquide, Societe Anonyme pour l'Etude et l'Exploitation des Procedes Georges Claude, Paris (FR)

(72) Inventors: Taekyu Kang, Newark, DE (US); Rong Fan, Katy, TX (US); Pavol Pranda, Hockessin, DE (US); Robert A. Gagliano, Cochranville, PA (US); Benjamin J. Jurcik, Jr., Landerberg, PA (US)

(73) Assignees: L'Air Liquide Societe Anonyme Pour L'Etude, Paris (FR); Et L'Exploration Des Procedes Georges Claude, Paris (FR)

( * ) Notice: Subject to any disclaimer, the term of this patent is extended or adjusted under 35 U.S.C. 154(b) by 0 days.

(21) Appl. No.: 15/417,930

(22) Filed: Jan. 27, 2017

(65) Prior Publication Data
US 2018/0215619 A1    Aug. 2, 2018

(51) Int. Cl.
*C01B 3/38*    (2006.01)
*C01B 3/36*    (2006.01)
(Continued)

(52) U.S. Cl.
CPC .............. *C01B 3/36* (2013.01); *B01D 53/047* (2013.01); *B01D 53/265* (2013.01); *C01B 3/382* (2013.01);
(Continued)

(58) Field of Classification Search
CPC ..... C01B 2203/0233; C01B 2203/0811; C01B 2203/0883; C01B 3/38; C01B 3/56;
(Continued)

(56) References Cited

U.S. PATENT DOCUMENTS 6,048,472 A * 4/2000 Nataraj .................... C01B 3/36
                                                            252/373
7,988,948 B2    8/2011 Guvelioglu et al.
(Continued)

FOREIGN PATENT DOCUMENTS

EP        3 018 095        5/2016
WO    WO 2006/095127    9/2006
WO    WO 2015/086752    6/2015

OTHER PUBLICATIONS

Hacarlioglu et al. "Studies of the Methane Steam Reforming Reaction at High Pressure in a Ceramic Membrane Reactor" Journal of Natural Gas Chemistry 15(2006)73-81 (Year: 2006).*
(Continued)

*Primary Examiner* — Amber R Orlando
*Assistant Examiner* — Syed T Iqbal
(74) *Attorney, Agent, or Firm* — Justin K. Murray (57) ABSTRACT

An improved hydrogen generation system and method for using the same are provided. The system includes an HDS unit configured to remove sulfur, a first and second pre-reformers configured to pre-reform a process gas and fuel gas, respectively, a first and second heat exchangers configured to dry and heat the pre-reformed fuel gas, respectively, and a reformer configured to produce a syngas and flue gas. The method includes using a process stream selected from the group consisting of air, PSA off-gas, hydrocarbon gas, and combinations thereof to dry the fuel gas and using a process stream selected from the group consisting of the flue gas, the syngas, and combinations thereof to heat the dry fuel gas. The second pre-reformer is a low-pressure pre-reformer, so that the heat contents of the fuel gas is increased through converting heavy hydrocarbons in the fuel gas to CO and $H_2$ by the second pre-reformer.

6 Claims, 9 Drawing Sheets

(51) Int. Cl.
  *B01D 53/047* (2006.01)
  *B01D 53/26* (2006.01)
  *C01B 3/56* (2006.01)
  *C10L 3/10* (2006.01)

(52) U.S. Cl.
  CPC ............... *C01B 3/384* (2013.01); *C01B 3/56* (2013.01); *C10L 3/103* (2013.01); *B01D 2256/16* (2013.01); *B01D 2257/502* (2013.01); *C01B 2203/0227* (2013.01); *C01B 2203/0255* (2013.01); *C01B 2203/0283* (2013.01); *C01B 2203/042* (2013.01); *C01B 2203/043* (2013.01); *C01B 2203/047* (2013.01); *C01B 2203/0811* (2013.01); *C01B 2203/0883* (2013.01); *C01B 2203/127* (2013.01); *C01B 2203/1241* (2013.01); *C01B 2203/1258* (2013.01); *C01B 2203/141* (2013.01); *C01B 2203/142* (2013.01); *Y02P 20/129* (2015.11)

(58) Field of Classification Search
  CPC ...... C01B 2203/0283; C01B 2203/042; C01B 2203/043; C01B 2203/047; C01B 2203/0475; C01B 2203/0827; C01B 2203/0833; C01B 2203/1235; C01B 2203/1241; C01B 3/384; C01B 3/48; B01D 2256/16; B01D 53/047; B01D 53/265; B01J 19/0013; B01J 2219/00074; B01J 2219/0015; B01J 7/02; Y02P 20/13
  See application file for complete search history.

(56) References Cited

U.S. PATENT DOCUMENTS

| | | | |
|---|---|---|---|
| 8,187,363 B2 | 5/2012 | Grover | |
| 2008/0244975 A1* | 10/2008 | Johnston | ............... B01J 19/249 48/197 FM |
| 2010/0264373 A1 | 10/2010 | Licht et al. | |
| 2011/0138853 A1* | 6/2011 | Haik-Beraud | .......... C01B 3/382 62/617 |

OTHER PUBLICATIONS

Cross et al. "An introduction to pre-reforming catalysis" Nitrogen+Syngas 341 | May-Jun. 2016, p. 40-48 (Year: 2016).*
International Search Report and Written Opinion for PCT/US2018/015387, dated May 3, 2018.

* cited by examiner

MAXIMIZING STEAM METHANE REFORMER COMBUSTION EFFICIENCY BY PRE-HEATING PRE-REFORMED FUEL GAS

TECHNICAL FIELD OF INVENTION

Disclosed are systems and methods for maximizing combustion efficiency in steam methane reformers (SMRs) through pre-heating a desulfurized pre-reformed fuel gas. In particular, a desulfurized fuel gas is pre-reformed at a lower pressure than the process gas, and the desulfurized pre-reformed fuel gas is cooled to remove water and then heated up before being combusted in the burners of a reformer.

BACKGROUND OF THE INVENTION

In large scale SMRs, approximately 50% of thermal energy input from burners is transferred to SMR reforming tubes to provide energy to drive the endothermic steam methane reforming reaction, $CH_4+H_2O+206$ kJ/mol $\rightleftharpoons CO+3H_2$ to produce a syngas ($CO+H_2$). Since the reforming reaction is generally carried out at a high temperature (e.g., 750° C. to 950° C.) the temperature of a flue gas from the burners is generally at this temperature or above. Currently, the main usages of the high temperature flue gas are to generate steam through a waste heat boiler or a flue gas boiler and/or to preheat combustion air. The steam may be used as a process steam for the SMRs and/or an export steam to customer. The steam may also be used to drive a generator depending upon the local requirements which may vary from site to site. One of the challenges for optimal design and operation of a SMR is that the demand for Hydrogen may be decoupled from the demand for the export steam from a reformer. Many refiners have little or no use for the export steam generated in a hydrogen plant, which is therefore considered of low value. In case steam value is very low and natural gas price is relatively high, it is desirable to utilize the excess energy in the flue gas stream and the syngas stream for other applications other than generating steam.

U.S. Pat. No. 8,187,363 issued to Grover, et al. discloses a method of pre-heating of pressure swing adsorber (PSA) tail gas using low level waste heat in the flue gas or syngas prior to introduction into the SMR furnace combustion system. However, Grover does not disclose a detailed implementation and does not disclose a method of pre-heating of fuel gas.

SUMMARY OF THE INVENTION

The present invention is directed to a system and method for use the same that satisfy at least one of these needs. The present invention is directed to a system and method that satisfy the need to increase thermal efficiency of SMRs. Certain embodiments of the present invention relate to converting heavy hydrocarbons to CO and $H_2$ in the fuel gas using a low-pressure pre-reformer in order to increase the heat contents of the fuel gas. Embodiments of the invention allow the SMR to run more efficiently because the fuel gas stream is pre-reformed at a low pressure, which improves the heating value of the fuel gas as compared to pre-reforming at the same pressure as the process gas. The pre-reformed fuel gas stream is dried and heated using a processing stream available in the system, respectively.

In one embodiment, the system includes a hydrodesulfurization unit configured to desulfurize hydrocarbons and produce a process gas stream and a desulfurized fuel gas stream, a first pre-reformer configured to receive the process gas stream and convert heavy hydrocarbons within the process gas stream to methane to produce a pre-reformed process gas, a second pre-reformer configured to receive the desulfurized fuel gas stream and convert heavy hydrocarbons within the desulfurized fuel gas stream to carbon monoxide and hydrogen to produce a pre-reformed fuel gas stream, a first heat exchanger configure to dry the pre-reformed fuel gas stream by cooling the pre-reformed fuel gas to a temperature below the dew point of water producing a dry fuel gas stream, a second heat exchanger heating the dry fuel gas stream forming a heated dry fuel gas stream, a reformer having a combustion zone and a reaction zone, wherein the reaction zone is in fluid communication with the first pre-reformer and configured to receive the pre-reformed process gas originating from the first pre-reformer, wherein the combustion zone is in fluid communication with the second heat exchanger and configured to receive the heated dry fuel gas stream originating from the second heat exchanger, wherein the reformer is configured to produce a syngas stream within the reaction zone and a flue gas within the combustion zone in the presence of combustion oxidant, a pressure swing adsorption (PSA) unit configured to receive the syngas stream and produce a product hydrogen stream and a PSA off-gas stream, wherein the first pre-reformer operates at a first pressure and the second pre-reformer operates at a second pressure, wherein the first pressure is greater than the second pressure.

In one embodiment, the method includes: a) desulfurizing a hydrocarbon to form a process gas stream and a fuel gas stream in a hydrodesulfurization (HDS) unit, b) pre-reforming the process gas stream in a first pre-reformer at a first pressure in the presence of steam under conditions effective form a pre-reformed process gas stream, c) pre-reforming the fuel gas stream in a second pre-reformer at a second pressure in the presence of steam under conditions effective form a pre-reformed fuel gas stream, wherein the first pressure is larger than the second pressure, d) drying the pre-reformed fuel gas stream by cooling the fuel gas stream to a temperature below the dew point of water producing a dry fuel gas stream, heating the dry fuel gas stream to form a heated dry fuel gas stream, converting methane within the process gas stream into carbon monoxide and hydrogen, thereby producing a syngas stream in a reaction zone of a reformer and a flue gas stream in a combustion zone of the reformer through combusting the heated dry fuel gas stream in the combustion zone of the reformer in the presence of combustion oxidant, wherein the combustion chamber is configured to exchange heat with the reaction zone, and introducing the syngas stream into a pressure swing adsorption (PSA) unit under conditions effective for producing a product hydrogen stream and a PSA off-gas stream.

Optional embodiments also include:
  wherein the first heat exchanger uses a process stream selected from the group consisting of combustion air, the PSA off-gas, the hydrocarbon gas stream, and combinations thereof, to cool down the fuel gas stream;
  wherein the second heat exchanger uses a process stream selected from the group consisting of the hot flue gas, the syngas stream, and combinations thereof, to heat up the dry fuel gas stream;
  wherein the first heat exchanger uses combustion air to dry the fuel gas stream and the second heat exchanger uses the hot flue gas stream to heat the dry fuel gas stream;

wherein the first heat exchanger uses the PSA off-gas to dry the fuel gas stream and the second heat exchanger uses the hot flue gas stream to heat the dry fuel gas stream;

wherein the first heat exchanger uses the hydrocarbon gas stream to dry the fuel gas stream and the second heat exchanger uses the hot flue gas stream to heat the dry fuel gas stream;

wherein the first heat exchanger uses combustion air to dry the fuel gas stream and the second heat exchanger uses the syngas gas stream to heat the dry fuel gas stream;

wherein the first heat exchanger uses the PSA off-gas to dry the fuel gas stream and the second heat exchanger uses the syngas gas stream to heat the dry fuel gas stream;

wherein the first heat exchanger uses the hydrocarbon gas stream to dry the fuel gas stream and the second heat exchanger uses the syngas gas stream to heat the dry fuel gas stream;

wherein the first per-former is an adiabatic pre-reformer which includes an insulated vessel filled with a pre-reforming catalyst;

wherein the second per-former is a non-adiabatic pre-reformer;

wherein the second per-former is a heated-up pre-reformer;

wherein the second per-former is a quasi-isothermal pre-reformer;

wherein the pressure of the second per-former is ranging from 1 to 5 bars;

wherein the pressure of the second per-former is ranging from 1 to 3 bars;

wherein the pre-reformed fuel gas stream is dried in step Error! Reference source not found. using a process stream selected from the group consisting of combustion air, the PSA off-gas, the hydrocarbon gas stream, and combinations thereof;

wherein the dry pre-reformed fuel gas stream is heated in step Error! Reference source not found. using a process stream selected from the group consisting of the hot flue gas, the syngas stream, and combinations thereof;

wherein the second performer is a non-adiabatic pre-reformer;

wherein the hydrocarbon is natural gas and the combustion oxidant is air;

a hydrocarbon source comprising a natural gas pipeline;

wherein the hydrocarbon is natural gas; and/or wherein the combustion oxidant is air.

BRIEF DESCRIPTION OF THE FIGURES

For a further understanding of the nature and objects of the present invention, reference should be made to the following detailed description, taken in conjunction with the accompanying drawings, in which like elements are given the same or analogous reference numbers and wherein.

DETAILED DESCRIPTION OF THE INVENTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

There have been numerous efforts to improve the thermal efficiency of standard SMRs. Pinch analyses show that the standard SMRs have been thermally well optimized, and therefore, further improvements related to heat exchanger designs are unlikely to yield much improvement. However, embodiments of the present invention can advantageously improve methods known heretofore by more effectively recovering waste heat without trying to re-optimize the process by overcoming temperature pinch.

Disclosed embodiments provide a straightforward approach in that a low temperature stream is used to cool a desulfurized pre-reformed fuel gas for removing water within it to form a dry pre-reformed fuel gas, and a high temperature stream is used to heat up the dry pre-reformed fuel gas to form a heated dry pre-reformed fuel gas fed to a reformer in order to maximize combustion efficiency in SMRs. The disclosed embodiments each include two pre-reformers. One is a low-pressure pre-reformer and used for pre-reforming the fuel gas. The other one is an adiabatic pre-reformer or other type of high pressure pre-reformers generally used in an SMR and used for pre-reforming the process gas. By using a low-pressure pre-reformer for the fuel gas, disclosed systems, processes and methods of the present invention may increase the combustion efficiency up to 13% compared to conventional SMRs, because it is more efficient for a pre-reformer to convert hydrocarbons existing in the fuel gas to CO and $H_2$ in a low pressure range, preferably, 1 to 3 bars, thereby increasing the energy contents or calorific heat of the fuel gas.

In certain embodiments, the low temperature stream may be a process stream having a temperature at ambient temperature or around ambient temperature. In another embodiment, the low temperature stream can include the PSA-off gas generated from an SMR, a cold combustion air at ambient temperature, hydrocarbons for use as process gas and fuel gas (e.g., natural gas (NG) at ambient temperature for use as process gas and fuel gas), or combinations thereof.

In certain embodiments, the high temperature stream can be a process stream having a temperature at around the reforming reaction temperature or product temperature (e.g., 750° C. to 950° C.) in the SMR. In another embodiment, the high temperature stream can include the flue gas stream and/or syngas stream generated from a reformer having a temperature around the reforming reaction temperature or product temperature or above. In certain embodiments, both process gas and fuel gas are desulfurized and pre-reformed.

Figure 1:
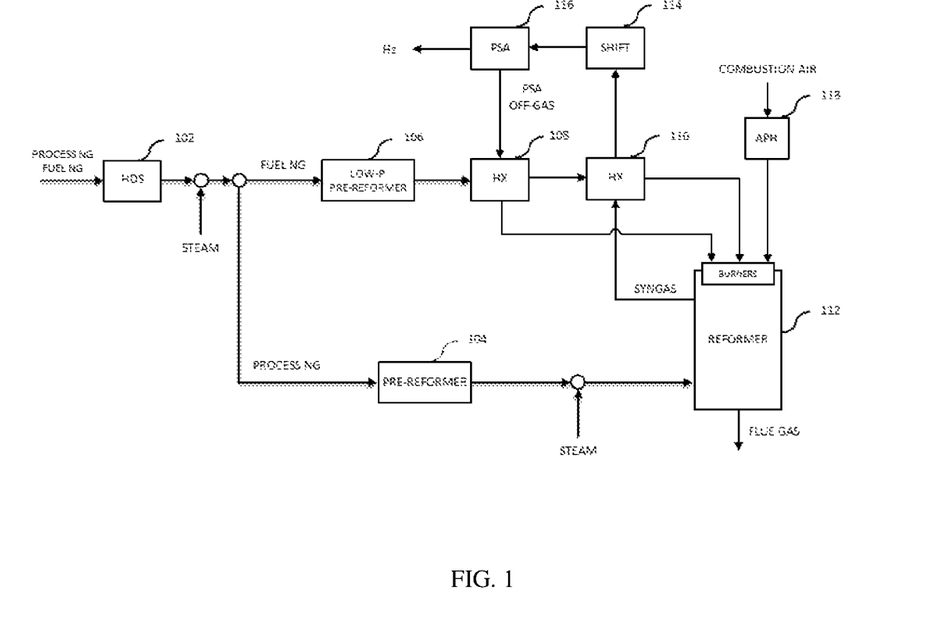
FIG. 1 illustrates a block flow diagram of an embodiment of an SMR system of the present invention.

FIG. 1 illustrates a block flow diagram of an embodiment of an SMR system of the present invention using the PSA off-gas stream as the low temperature stream and using the syngas stream as the high temperature stream. As illustrated, the hydrocarbon gas, such as, natural gas, for use as process gas and fuel gas is pre-heated (not shown) and sent to hydrodesulfurization unit (HDS) 102 where any sulfur that is present in the natural gas is removed. Here, one of ordinary skill in the art would recognize that the natural gas fed to HDS 102 is delivered from a natural gas pipeline that has a pressure ranging from tens of bars to 100 bars.

Following sulfur removal, the natural gas is mixed with steam or water vapor and then split into two streams. The first stream is used as a process gas stream. The second one is used as a fuel gas stream. Alternatively, the natural gas may be split into two streams first and then the two streams each are mixed with steam or water vapor to form the process gas stream and the fuel gas stream, respectively. The process gas stream is fed to pre-reformer 104 for breaking down long chain hydrocarbons in the natural gas into light hydrocarbons (e.g., herein methane) to produce a pre-reformed process gas, thereby increasing the amount of methane within the process gas and avoiding carbon deposition in reformer 112.

In one embodiment, reformer 112 can include a reaction zone and a combustion zone, wherein the reaction zone contains a plurality of reforming tubes, wherein the combustion zone can include a plurality of burners and a combustion chamber, wherein the burners combust the fuel gas in the presence of a combustion air in the combustion chamber to provide heat for the endothermic reforming reaction conducted in the reaction zone and the combustion chamber is configured to exchange heat with the reaction zone.

Pre-reformer 104 may be an adiabatic pre-reformer having a pressure close to that of reformer 112 ranging from 30 to 40 bars, preferably, around 35 bars. The pre-reformed process gas stream is then introduced into the reaction zone of reformer 112 in the presence of steam under reforming conditions effective for converting methane within the pre-reformed process gas into carbon monoxide (CO) and hydrogen ($H_2$) through the endothermic reaction thereby producing the syngas stream.

In parallel, the wet fuel gas stream is expanded by expansion means (not shown) before being introduced into low-pressure pre-reformer 106 where long chain hydrocarbons in the fuel gas are broken down to CO and $H_2$, thereby increasing heat values or energy contents (e.g., lower heating value (LHV)) of the fuel gas avoiding cracking natural gas or methane within the fuel gas.

Depending on the volumetric flow of the wet fuel gas stream, those of ordinary skill in the art will recognize that the expansion means could include a valve or a turbine. In one embodiment, the turbine can power a generator in order to provide power for the system or to send energy back to the grid.

For example, if $C_2H_6$ exists in the fuel gas, then $C_2H_6$ can be broken down to CO and $H_2$ through the following exothermic reaction carried out in low-pressure pre-reformer 106: $C_2H_6 + 2H_2O \rightleftharpoons 2CO + 5H_2$. The energy content of the fuel gas may be increased because of the fuel conversion through the low-pressure pre-reformer as shown in Table 1. As illustrated, after pre-reforming $C_2H_6$, the exothermic reaction generates more calorific heat or energy, thereby producing more heat by a complete combustion of the fuel gas in reformer 112.

TABLE 1

Energy contents of $C_2H_6$ through reforming

| | $C_2H_6 + 2H_2O \rightleftharpoons 2CO + 5H_2$ | | |
|---|---|---|---|
| Heat (kJ/mol) | 1437 | 2 × 283 | 5 × 244 |
| Total Heat (kJ/mol) | 1437 | | 1786 |

In a preferred embodiment, the pre-reformer catalyst is specifically designed for removing heavier or higher hydrocarbons. For example, the pre-reformer catalyst has a relatively higher surface area and has a Ni content of around 25-50 wt %. Therefore, only long chain hydrocarbons may be converted to $CO+H_2$. In a preferred embodiment, the HDS (herein HDS 102) is used upstream of the pre-reformer in order to remove sulfur. As a result, the pre-reformer catalyst poison by the sulfur and sulfuric acid/sulphate condensation in a low temperature portion of the flue gas channel may be eliminated.

In a preferred embodiment, the pressure within the burners and the combustion chamber of reformer 112 is around atmospheric pressure. Low-pressure pre-reformer 106 may operate at a pressure close to atmosphere pressure or a few bars or several bars, for example, 1-5 bars, preferably 1-3 bars, which is close to but slightly higher than the pressure within the burners and the combustion chamber of reformer 112, thereby making the fuel gas flow effectively.

Since the pressure of pre-reformer 104 is higher than that of low-pressure pre-reformer 106, a gas coupling device may be installed after HDS 102. The gas coupling device may have one input in fluid communication with HDS 102 and two outputs in fluid communication with pre-reformer 104 and low pressure pre-reformer 106, respectively. The gas coupling device may be a unidirectional gas coupling device that not only prevent backflow of the desulfurized natural gas from the outputs to the input, but also prevent backflow of the desulfurized natural gas from the output connected to pre-reformer 104 to the output connected to low-pressure pre-reformer 106 due to the pressure difference between pre-reformer 104 and low-pressure pre-reformer 106. Those of ordinary skill in the art will recognize that the gas coupling device may be a backflow restrictor. In certain embodiments, a relatively small side stream of pre-reformer 104 may be fed to low-pressure pre-reformer 106 with a backflow restrictor, which maintains low-pressure pre-reformer 106 at a preferred low pressure range.

By pre-reforming the fuel gas at a lower pressure as compared to pre-reformer 104, an improved heating value for the fuel gas can be achieved. This is because low pressures (e.g., about 1 to 5 bars) with a proper steam/carbon ratio (S/C) provide much better low heating values of the pre-reformed fuel than that pre-reformed at higher pressures (i.e., anything above 5 bars).

Figure 9:
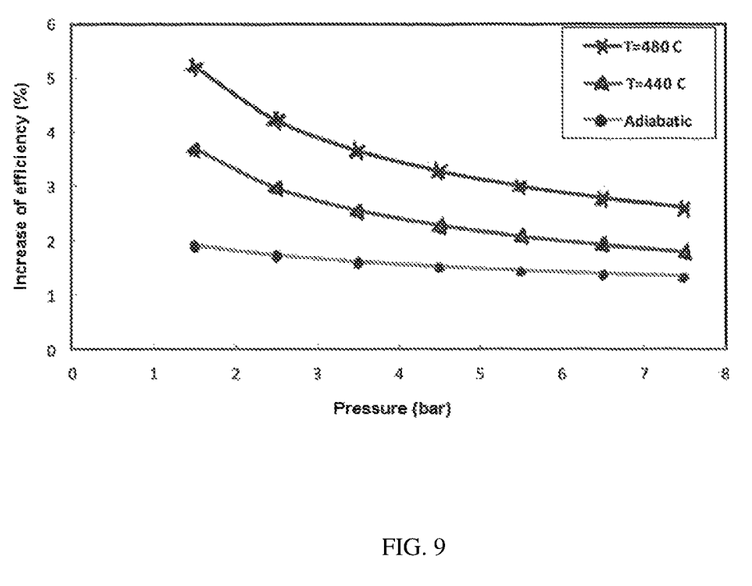
FIG. 9 is a graph of thermal efficiency increase versus pressure for a pre-reformer calculated for 90/10 methane/ethane with steam (S/C=2) at different temperatures.

At a lower pressure or a pressure a slightly higher than ambient pressure, the higher hydrocarbons are cracked down to methane in a pre-reformer and the methane may be further converted to CO and $H_2$ resulting in an increase of the energy content or calorific heat of the fuel gas, thereby increasing the thermal efficiency. FIG. 9 is a graph of efficiency increase versus pressure for a pre-reformer calculated for 90/10 methane/ethane with steam (S/C=2) at different temperatures. As shown, low pressure is beneficial to the efficiency, that is, more methane can be further converted to CO and $H_2$ resulting in an increased LHV. FIG. 9 also shows that increasing temperature is in favor of the efficiency. Thus, a low-pressure pre-reformer is applied herein to pre-reform the fuel gas. In certain embodiments, a low-pressure pre-reformer may only be used in the fuel gas stream since the fuels gas is combusted in the combustion chamber at ambient pressure, whereas the process gas is sent to the reformer tubes at higher pressures (e.g., 30 to 40 bar).

Low-pressure pre-reformer 106 may be a non-adiabatic pre-reformer, such as a heated-up pre-reformer or a quasi-isothermal pre-reformer that operates at a pressure close to or slightly higher than ambient pressure, preferably, 1 to 3 bars. In practice, the quasi-isothermal pre-reformer may be composed of a multiple stages of adiabatic pre-formers or using a multiple tube reactors, in which reactants are re-heated using the waste energy after one stage or one tube reactor before moving into the next stage or next tube reactor to mimic isothermal operation.

Following low-pressure pre-reformer 106, the pre-reformed fuel gas is still wet. While the presence of water is preferable for the pre-reformed process gas (since the reforming reaction uses water), water vapor in the fuel gas is not desired, since the water vapor does not provide any combustion duty, and therefore, would just absorb combustion heat during combustion thereby reducing the efficiencies of combustion. Thus, in embodiments of the present invention, the pre-reformed fuel gas is dried, which in certain embodiments can be achieved by cooling the pre-reformed fuel gas to a temperature below the dew point of water in low temperature heat exchanger (HX) 108. Following drying, the dried fuel gas stream is preferably heated up in a higher temperature HX 110 before being sent to the burners in order to improve combustion efficiencies. The various figures provide various examples of which process streams can provide low temperature cooling (HX 108) or higher temperature heating (HX 110).

Now turning back to FIG. 1, following pre-reforming, the fuel gas in low-pressure pre-reformer 106 is dried by cooling the pre-reformed fuel gas stream in HX 108 to remove water contained within the fuel gas stream. More specifically, the fuel gas exiting low pressure pre-reformer 106 is cooled in HX 108 by heat exchange with the PSA off-gas from PSA unit 116 down to a temperature below the dew point of water thereby producing a dry fuel gas stream. By removing water from the fuel gas, the natural gas content in the fuel gas is relatively increased, thereby offering the possibility of significant fuel cost reduction and higher system combustion efficiencies comparing to the conventional SMRs. Additionally, by cooling the pre-reformed fuel gas, the PSA off-gas is pre-heated and the pre-heated PSA off-gas is then fed to the burners of reformer 112 for use as fuel.

The dry fuel gas stream is subsequently heated in HX 110 by heat exchange with the syngas stream exiting reformer 112 thereby forming a heated dry fuel gas stream. The heated dry fuel gas stream is then fed to the burners of reformer 112 where the burners combust the heated dry fuel gas and the pre-heated PSA off-gas in the presence of a combustion air introduced from air pre-heater (APH) 118 in the combustion chamber, thereby providing heat for the endothermic reaction conducted in the reforming tubes to form the syngas and producing a flue gas therefrom.

The flue gas stream and the syngas stream are removed from reformer 112, in which the syngas stream is used for heating up the dry fuel gas by heat exchange in HX 110 as described above (i.e., higher temperature heat recovery), while the flue gas is used for recovering heat by various heat exchange processes, for example, generating steam, heating the combustion air (not shown). After heating up the dry fuel gas stream, the syngas is converted to carbon dioxide ($CO_2$) and hydrogen ($H_2$) through shift 112 through a water gas-shift reaction ($CO+H_2O \rightleftharpoons CO_2+H_2$) to produce additional $H_2$ thereby forming a shifted gas. The shifted gas is cooled further down to a temperature below the water dew point or ambient temperature to knock out steam or water vapor before entering PSA unit 116. A product $H_2$ stream and the PSA off-gas stream are consequently produced from PSA unit 116. The PSA-off-gas includes CO, $CO_2$, $H_2$, and $CH_4$.

In the embodiment shown in FIG. 1, a cold combustion air at ambient temperature (e.g., 15° C.) is heated up in APH 118 to form the combustion air. The combustion air is then fed to the burners of reformer 112 in conjunction with the heated dry fuel gas and the PSA off-gas for combustion in the combustion zone of reformer 112.

Figure 2:
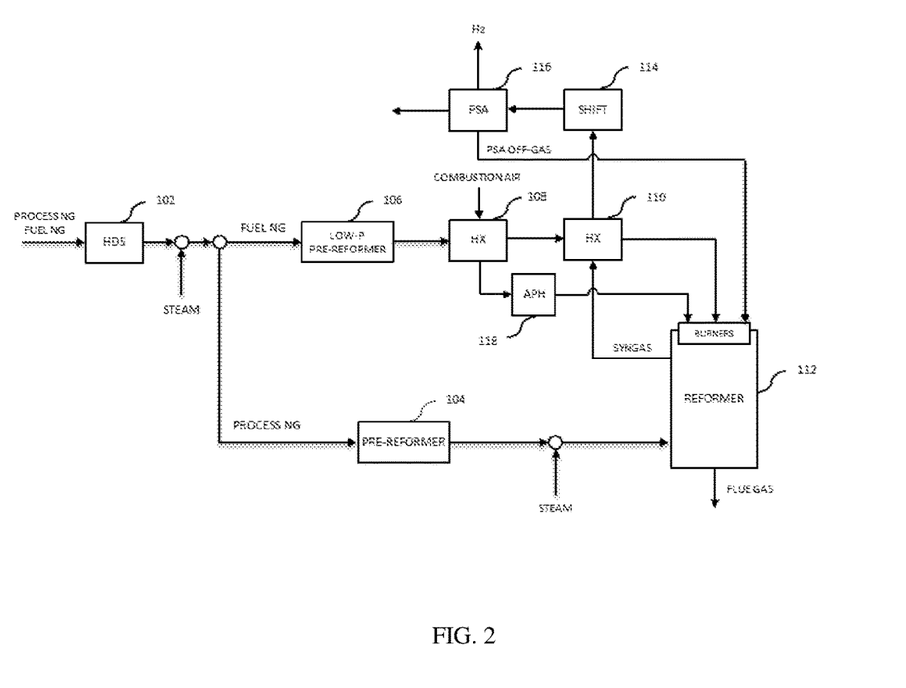
FIG. 2 illustrates a block flow diagram of a second embodiment of an SMR system of the present invention.

FIG. 2 illustrates a block flow diagram of a second embodiment of an SMR system of the present invention using the cold combustion air stream as the low temperature stream and using the syngas stream as the high temperature stream. The difference between the embodiments illustrated in FIG. 2 and FIG. 1 is the cold combustion air at ambient temperature is used in heat exchanger HX 108 in FIG. 2 to cool down the desulfurized pre-reformed fuel gas stream in order to remove water therein. In this embodiment, the PSA off-gas produced in PSA unit 116 is herein directly sent back to reformer 112 without pre-heating. Alternatively, the PSA off-gas produced in PSA unit 116 may be sent back to reformer 112 pre-heated by a heat exchanger through heat exchange with a waste stream such as a flue gas (not shown). The fuel gas downstream of low-pressure pre-reformer 106 is cooled in heat exchanger HX 108 by heat exchange with the cold combustion air at ambient temperature, down to a temperature below the dew point of water producing a dry fuel gas stream. By cooling the pre-reformed fuel gas, the cold combustion air is heated up and the heated combustion air is further heated up with APH 118. After that, the further heated combustion air is fed to the burners of reformer 112 for use as combustion air.

Figure 3:
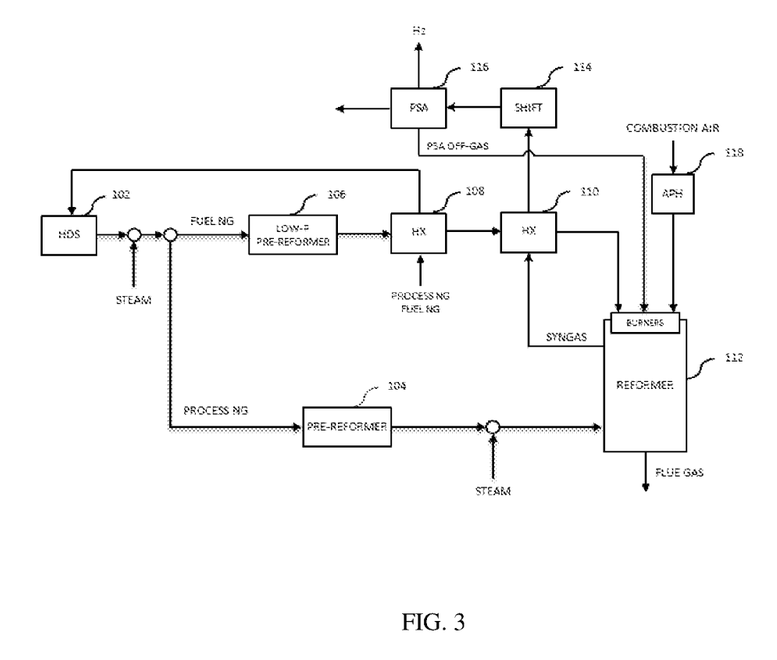
FIG. 3 illustrates a block flow diagram of a third embodiment of an SMR system of the present invention.

FIG. 3 illustrates a block flow diagram of a third embodiment of an SMR system of the present invention using the hydrocarbons gas (e.g., natural gas) at ambient temperature as the low temperature stream and using the syngas stream as the high temperature stream. The difference between the embodiments illustrated in FIG. 3 and FIG. 2 is the hydrocarbon gas at ambient temperature is used in HX 108 of FIG. 3 to cool the fuel gas stream in order to remove water in the fuel gas, rather than using the cold combustion air.

In this embodiment, the natural gas for use as process gas and fuel gas is pre-heated by heat exchange with the pre-reformed fuel gas in HX 108. After pre-heated, the natural gas is forwarded to HDS 102 where sulfur in the natural gas is removed. The fuel gas downstream of low-pressure pre-reformer 106 is cooled in HX 108 by heat exchange with the natural gas down to a temperature below the dew point of water to remove water producing a dry fuel gas stream. By cooling the pre-reformed fuel gas, the natural gas is heated up, as described above. Herein, a cold combustion air at ambient temperature is pre-heated in APH 118 to form the pre-heated combustion air.

Figure 4:
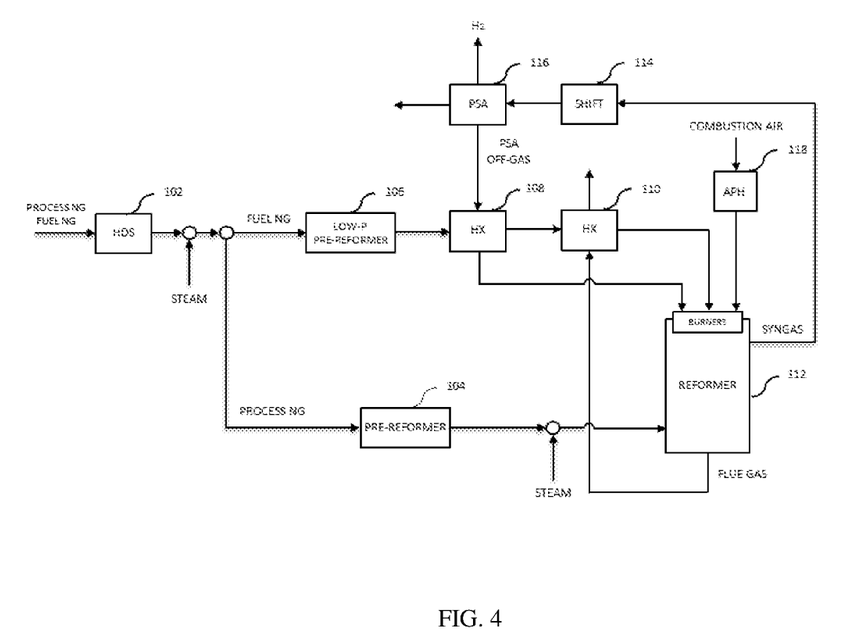
FIG. 4 illustrates a block flow diagram of a fourth embodiment of an SMR system of the present invention.

FIG. 4 illustrates a block flow diagram of a fourth embodiment of an SMR system of the present invention using the PSA off-gas stream as the low temperature stream and the flue gas stream as the high temperature stream. The difference between the embodiments illustrated in FIG. 4 and FIG. 1 is the flue gas stream is used as the high temperature stream in HX 110 of FIG. 4 to heat the dry fuel gas and the syngas is directly sent to shift 114.

Figure 5:
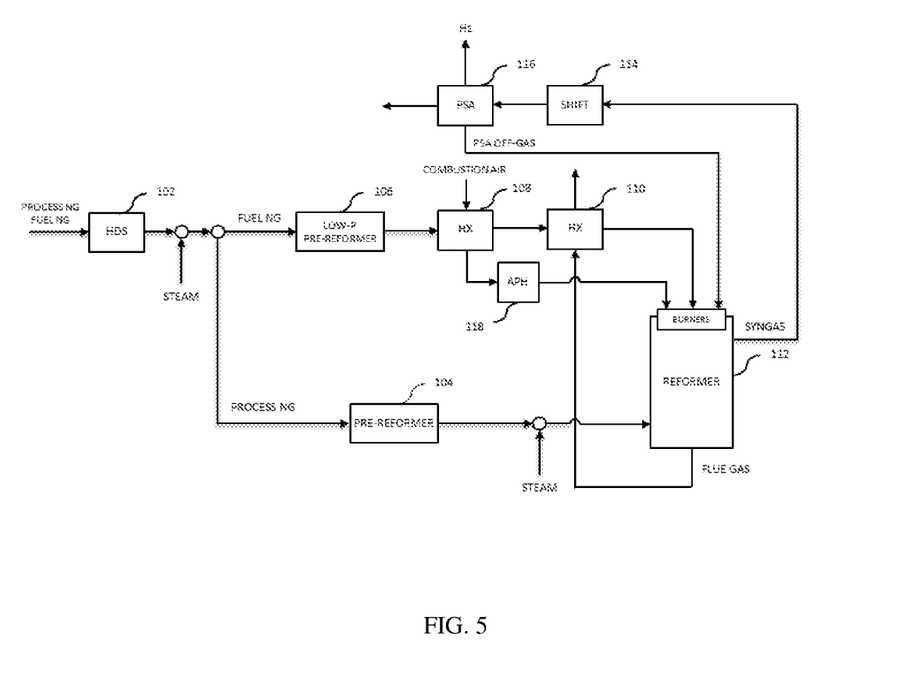
FIG. 5 illustrates a block flow diagram of a fifth embodiment of an SMR system of the present invention.

FIG. 5 illustrates a block flow diagram of a fifth embodiment of an SMR system of the present invention using the cold combustion air as the low temperature stream and the flue gas stream as the high temperature stream. The difference between the embodiments illustrated in FIG. 5 and FIG. 2 is the flue gas stream is used as the high temperature stream in HX 110 of FIG. 5 to heat the dray fuel gas and the syngas is directly sent to shift 114.

Figure 6:
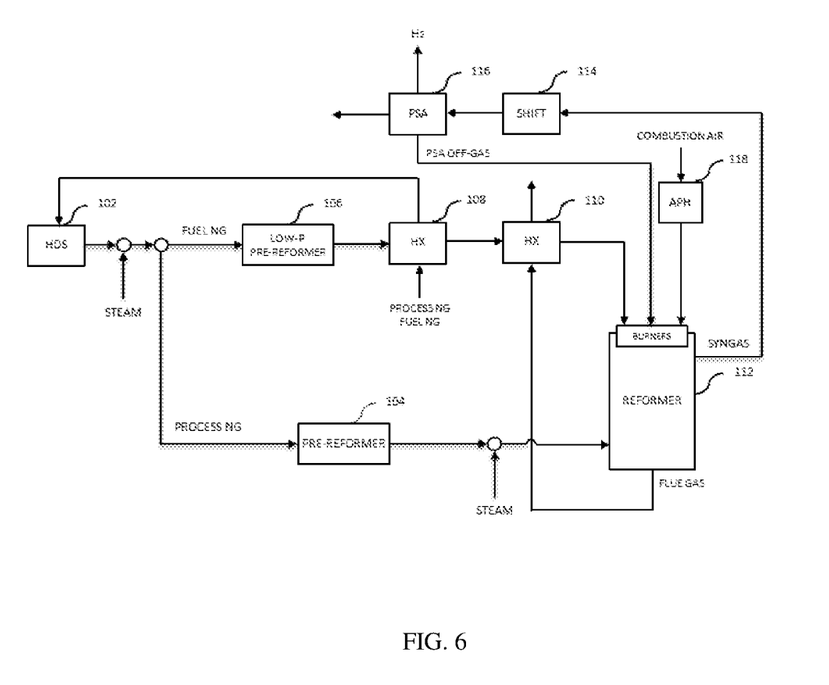
FIG. 6 illustrates a block flow diagram of a sixth embodiment of an SMR system of the present invention.

FIG. 6 illustrates a block flow diagram of a sixth embodiment of an SMR system of the present invention using the hydrocarbons gas at ambient temperature as the low temperature stream and the flue gas stream as the high temperature stream. The difference between the embodiments illustrated in FIG. 6 and FIG. 3 is the flue gas stream is used as the high temperature stream in HX 110 of FIG. 6 to heat the dray fuel gas and the syngas is directly sent to shift 114.

Figure 7:
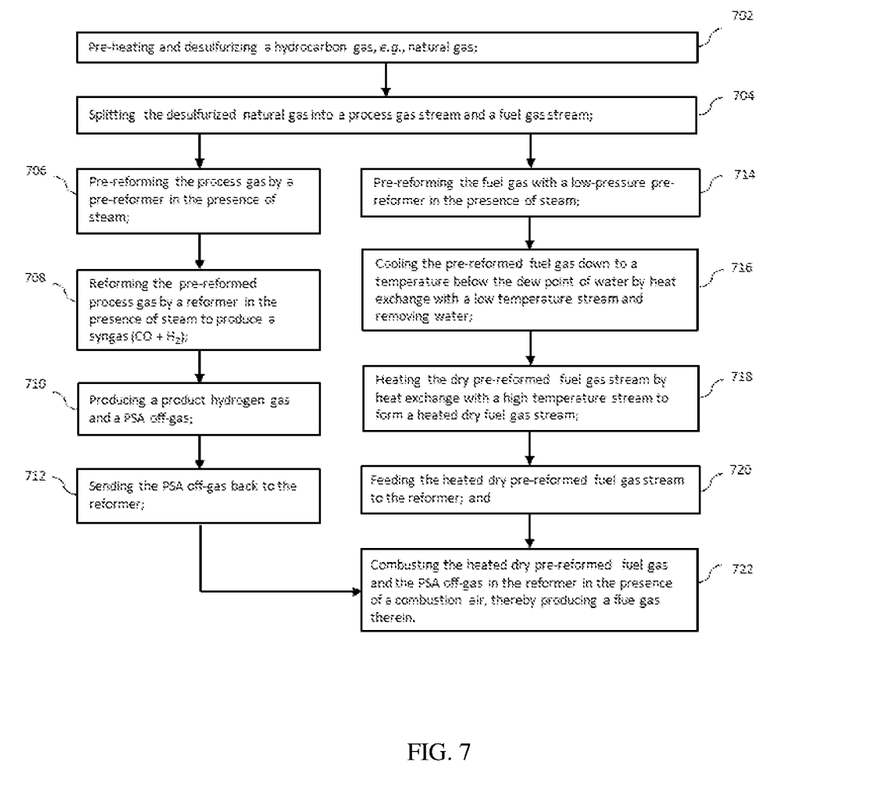
FIG. 7 illustrates a flowchart of a method for maximizing combustion efficiency in a SMR system in accordance with an embodiment of the present invention.

FIG. 7 illustrates a flowchart of a method for maximizing combustion efficiency in an SMR system of the present invention. At step 702, a hydrocarbon gas at ambient temperature for use as process and fuel gas is pre-heated and then desulfurized in the HDS unit to remove sulfur in the natural gas. At step 704, the desulfurized natural gas stream is split into two streams, one stream is used as a process gas, and the other one is used as a fuel gas. At step 706, in the presence of steam, the process gas is pre-reformed in a pre-reformer to break down long chain hydrocarbons existing in the desulfurized natural gas into light hydrocarbons (e.g., methane,) thereby increasing the amount of methane in the desulfurized natural gas and avoiding carbon deposition. At step 708, the pre-reformed process gas can be fed to the reformer where a syngas stream is produced in the reaction zone and a flue gas stream is produced in the combustion zone. In certain embodiments, the reaction zone can include a plurality of reforming tubes, and the combustion zone can also contain a plurality of burners, wherein the combustion zone is configured to exchange heat with the reaction zone.

In certain embodiments, the pre-reformed process gas mixing with the process steam reacts in the reforming tubes in the reaction zone of the reformer thereby producing a syngas stream. A plurality of burners of the reformer combust the fuel gas and the PSA off-gas in the presence of an oxidant (e.g., the combustion air) in the combustion zone of the reformer for providing heat for the endothermic reforming reaction to produce a flue gas therefrom. As used herein, the combustion air can also include an oxygen enriched gas stream.

In certain embodiments, the process steam can be added to the process gas stream before the process gas stream enters the pre-reformer (104). The process steam can be also added to the pre-reformed process gas before the pre-reformed process gas enters the reformer. At step 710, the CO in the syngas stream can be converted to carbon dioxide and hydrogen in the presence of the process steam in a shift converter for producing more hydrogen. The converted syngas stream can be dried in a syngas dryer and then introduced into a PSA unit to produce a product of hydrogen stream and a PSA off-gas stream. The PSA-off-gas includes $CO$, $CO_2$, $H_2$ and $CH_4$. and is sent back to the reformer for use as fuel at step 712.

At step 714, in parallel with pre-reforming the process gas at step 706, in the presence of steam, the fuel gas is pre-reformed in a low-pressure pre-reformer to break down long chain hydrocarbons probably existing in the fuel gas into CO and $H_2$, thereby increasing the energy contents or calorific heat of the fuel gas.

As stated previously, a pre-reformer can more efficiently convert hydrocarbons to CO and $H_2$ in a low pressure range, for example, 1 to 5 bars, more preferably 1 to 3 bars. The low-pressure pre-reformer may be a non-adiabatic pre-reformer, for example, a heated-up pre-reformer or a quasi-isothermal pre-reformer. In embodiments of the current invention, it is preferable to only operate the fuel gas pre-reformer at low pressure since the process gas used to produce syngas is needed at higher pressures. The low-pressure pre-reformer can be operated at a pressure close to or slightly higher than ambient pressure, a few bars, preferably 1 to 5 bars, more preferably 1 to 3 bars, or slightly higher than the pressure within the combustion chamber of the reformer, which makes the fuel gas flow effectively.

Notwithstanding the above, in one embodiment, the higher pressure process natural gas can be expanded across a process gas turbine such that it can be pre-reformed in pre-reformer 104 at a low pressure (i.e., less than 5 bar). After pre-reforming, the process gas can then be compressed in a compressor driven by the process gas turbine and/or the fuel gas turboexpander. This advantageously provides for improved pre-reforming at low pressure and reforming at higher pressures with minimal operating expenses.

Figure 8:
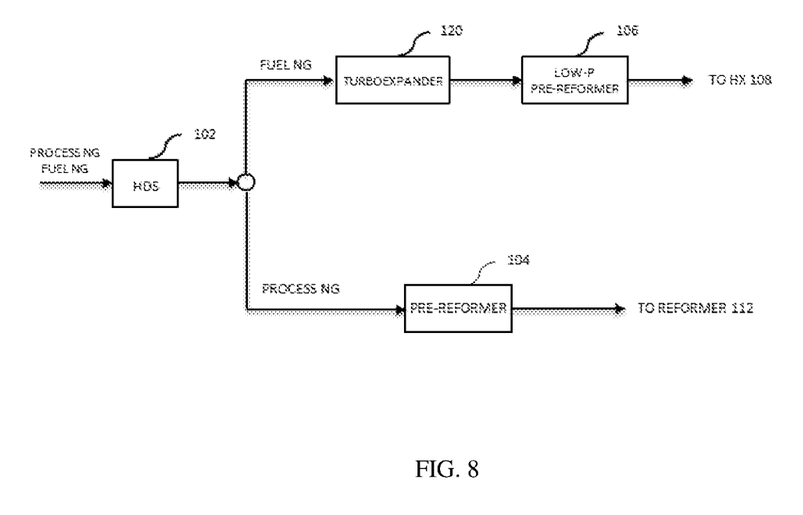
FIG. 8 illustrates a block flow diagram of an embodiment of an SMR system having a turboexpander of the present invention.

As shown in FIG. 8, fuel gas turboexpander 120 can be installed upstream of low-pressure pre-reformer 106 to expand the fuel gas to a low pressure for use in low-pressure pre-reformer 106. Turboexpander 120 may be an expansion turbine that is a centrifugal or axial flow turbine through which a high pressure gas is expanded to produce work that can be used to drive a compressor (not shown) and/or an electric turbine (not shown). Additionally, expansion of the fuel gas creates additional refrigeration that can be used for any purpose known in the art. It is preferable to maintain the fuel gas exiting turboexpander 120 in gaseous form, and therefore, it is preferable to avoid liquefaction.

At step 716, the pre-reformed fuel gas is dried by cooling it down to a temperature below the dew point of water by heat exchange with a low temperature process stream forming a dry fuel gas stream. The low temperature process stream can be selected from the group consisting of the PSA-off gas generated from the reformer, the cold combustion air at ambient temperature, the hydrocarbons for use as process gas and fuel gas at ambient temperature, and combinations thereof.

As noted previously, while cooling the pre-reformed fuel gas, the low temperature process stream is advantageously pre-heated, which provides additional synergies (e.g., the PSA off-gas is pre-heated before sending back to the reformer, or the cold combustion air is pre-headed before fed to the reformer for combusting the fuel gas and the PSA off-gas, and/or the natural gas for use as process gas and fuel gas is pre-heated before fed to an HDS unit for removing sulfur). As a result, the wet pre-reformed fuel gas can be dried via heat exchange without wasting heat from the pre-reformed fuel gas.

At step 718, the dry fuel gas stream is heated by heat exchange with a high temperature process stream forming a heated dry fuel gas stream. The high temperature process stream can be selected from the group consisting of the syngas stream, a flue gas stream generated from the reformer, and combinations thereof.

At step 720, the heated dry fuel gas stream is fed to the burners of the reformer for use as fuel. Finally, at step 722, the burners combust the heated dry fuel gas and the PSA off-gas in the presence of a pre-heated combustion air introduced from an air pre-heater in the combustion chamber of the reformer to produce the flue gas. The syngas produced at step 708 and the flue gas produced at this step may be used as the high temperature process stream for heating up the dry fuel gas herein at step 718.

The disclosed embodiments have several advantages over the conventional SMRs. First, by pre-reforming the fuel gas with a low-pressure pre-reformer, longer chain hydrocarbons such as ethane in the fuel gas stream are broken down to CO and $H_2$ that increases the energy contents or heat values of the fuel gas, which offers the possibility of significant fuel cost reduction and higher system combustion efficiencies comparing to the conventional SMRs.

Second, by removing water from the pre-reformed desulfurized fuel gas, the natural gas or methane content in the fuel gas is relatively increased, thereby further offering the possibility of significant fuel cost reduction and higher system combustion efficiencies comparing to the conventional SMRs. Furthermore, by cooling the pre-reformed desulfurized fuel gas down to a temperature below the dew point of water to remove water, the relatively low temperature streams, such as, the PSA off-gas, the cold combustion air, natural gas at ambient temperature for use as process gas and fuel gas, or combinations thereof, can be pre-heated, thereby recycling heat from the pre-reformed desulfurized fuel gas.

Third, the natural gas for use as fuel gas and process gas is desulfurized in the disclosed embodiments. This means that the energy of either the flue gas or the syngas below the sulfuric acid dew point may be utilized, so that the sulfuric acid or sulphate condensation in the system may be eliminated. In other words, since sulfur is removed in the fuel gas stream, the temperature of the flue gas can be reduced below the dew point of sulfuric acid without sulfuric acid condensation in the SMR system, which helps to eliminate corrosion of the equipment operated in the low temperature range. In certain embodiments, this advantageously allows for use of carbon steel instead of stainless steel.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

Note that herein, the terms "heavy hydrocarbon", "heavier hydrocarbon", "higher hydrocarbon" and "long chain hydrocarbon" refer to $C_2$ and $C_{2+}$ hydrocarbon and may be used interchangeably.

The singular forms "a", "an" and "the" include plural referents, unless the context clearly dictates otherwise.

"About" or "around" or "approximately" in the text or in a claim means ±10% of the value stated.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

We claim:

1. A method for improving thermodynamic efficiency in a hydrogen generation system, the method comprising the steps of:
    a) desulfurizing a hydrocarbon to form a process gas stream and a fuel gas stream in a hydrodesulfurization (HDS) unit;
    b) pre-reforming the process gas stream in a first pre-reformer at a first pressure in the presence of steam under conditions effective to form a pre-reformed process gas stream;
    c) pre-reforming the fuel gas stream in a second pre-reformer at a second pressure in the presence of steam under conditions effective to form a pre-reformed fuel gas stream, wherein the first pressure is larger than the second pressure;
    d) drying the pre-reformed fuel gas stream by cooling the fuel gas stream to a temperature below the dew point of water thereby producing a dry fuel gas stream;
    e) heating the dry fuel gas stream to form a heated dry fuel gas stream; and
    f) converting methane within the process gas stream into carbon monoxide and hydrogen, thereby producing a syngas stream in a reaction zone of a reformer and a flue gas stream in a combustion zone of the reformer through combusting the heated dry fuel gas stream in the combustion zone of the reformer in the presence of combustion oxidant, wherein the combustion chamber is configured to exchange heat with the reaction zone; and
    g) introducing the syngas stream into a pressure swing adsorption (PSA) unit under conditions effective for producing a product hydrogen stream and a PSA off-gas stream.

2. The method of claim 1, wherein the pre-reformed fuel gas stream is dried in step d) using a process stream selected from the group consisting of combustion air, the PSA off-gas, the hydrocarbon gas stream, and combinations thereof.

3. The method of claim 1, wherein the dry pre-reformed fuel gas stream is heated in step e) using a process stream selected from the group consisting of the hot flue gas, the syngas stream, and combinations thereof.

4. The method of claim 1, wherein the second pre-reformer is a non-adiabatic pre-reformer.

5. The method of claim 4, wherein the pressure of the second pre-reformer is ranging from 1 to 3 bars.

6. The method of claim 5, wherein the hydrocarbon is natural gas and the combustion oxidant is air.

\* \* \* \* \*